United States Patent
Carnevale et al.

(10) Patent No.: US 7,512,143 B2
(45) Date of Patent: Mar. 31, 2009

(54) BUFFER MANAGEMENT FOR A TARGET CHANNEL ADAPTER

(75) Inventors: Michael Joseph Carnevale, Rochester, MN (US); Daniel Frank Moertl, Rochester, MN (US); Timothy Jerry Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 10/688,220

(22) Filed: Oct. 16, 2003

(65) Prior Publication Data

US 2005/0083956 A1 Apr. 21, 2005

(51) Int. Cl.
*H04L 12/28* (2006.01)
*H04L 12/56* (2006.01)

(52) U.S. Cl. .................................... 370/412
(58) Field of Classification Search ............... 370/229, 370/230, 352, 364, 365, 368, 412, 413, 429, 370/496; 709/214; 710/305; 711/114, 118
See application file for complete search history.

(56) References Cited

U.S. PATENT DOCUMENTS

| | | | |
|---|---|---|---|
| 2003/0058875 A1* | 3/2003 | Arndt et al. | 370/412 |
| 2003/0061417 A1* | 3/2003 | Craddock et al. | 710/54 |
| 2003/0093627 A1* | 5/2003 | Neal et al. | 711/153 |
| 2004/0019882 A1* | 1/2004 | Haydt | 717/151 |
| 2004/0049600 A1* | 3/2004 | Boyd et al. | 709/250 |

* cited by examiner

*Primary Examiner*—Kevin C Harper
*Assistant Examiner*—Leon Andrews
(74) *Attorney, Agent, or Firm*—Owen J. Gamon

(57) ABSTRACT

A method, apparatus, system, and signal-bearing medium that in an embodiment determine whether a current number of buffers allocated to a queue pair is less than a maximum number of buffers for the queue pair, decide whether a current number of buffers allocated to an operation type is less than a maximum number of buffers for the operation, and allocate a buffer to the queue pair if the queue pair requests the buffer for an operation having the operation type and the determining and the deciding are true. In this way, too much buffer space is prevented from being assigned to particular operation and to a particular queue pair.

18 Claims, 7 Drawing Sheets

BUFFER MANAGEMENT FOR A TARGET CHANNEL ADAPTER

FIELD

This invention generally relates to a target channel adapter and more specifically relates to buffer management for a target channel adapter.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. One of the primary uses of computer systems is for data storage and retrieval across a network.

An example of one such network is called Infiniband, which uses a memory-based user-level communication abstraction called a queue pair (QP), which is the logical endpoint of a communication link across the network. The queue pair is a memory-abstraction where communication is achieved through direct memory-to-memory transfers between applications and devices in the network. All transactions or operations in a switch fabric of the network are handled via work requests sent to target channel adapters.

Each work request requires the target channel adapter to allocate a variable amount of memory and then deallocate the memory after the operation completes. This can result in multiple interrupts to the firmware of the target channel adapter, as much as one per incoming frame of data. In addition, the target channel adapter may have many queue pairs, each with many outstanding work requests, and the buffer management of one queue pair may over-utilize the free memory in the target channel adapter to the detriment of other queue pairs. Thus, the target channel adapter may become bottlenecked while managing its pool of free memory, which can lead to poor performance.

Without a better way to handle the allocation and deallocation of memory, computer networks will continue to suffer with poor performance, which is annoying and expensive for the users. Although the aforementioned problems have been described in the context of Infiniband, they apply to any type of network.

SUMMARY

A method, apparatus, system, and signal-bearing medium are provided that in an embodiment determine whether a current number of buffers allocated to a queue pair is less than a maximum number of buffers for the queue pair, decide whether a current number of buffers allocated to an operation type is less than a maximum number of buffers for the operation, and allocate a buffer to the queue pair if the queue pair requests the buffer for an operation having the operation type and the determining and the deciding are true. In this way, too much buffer space is prevented from being assigned to particular operation and to a particular queue pair.

DETAILED DESCRIPTION

Figure 1:
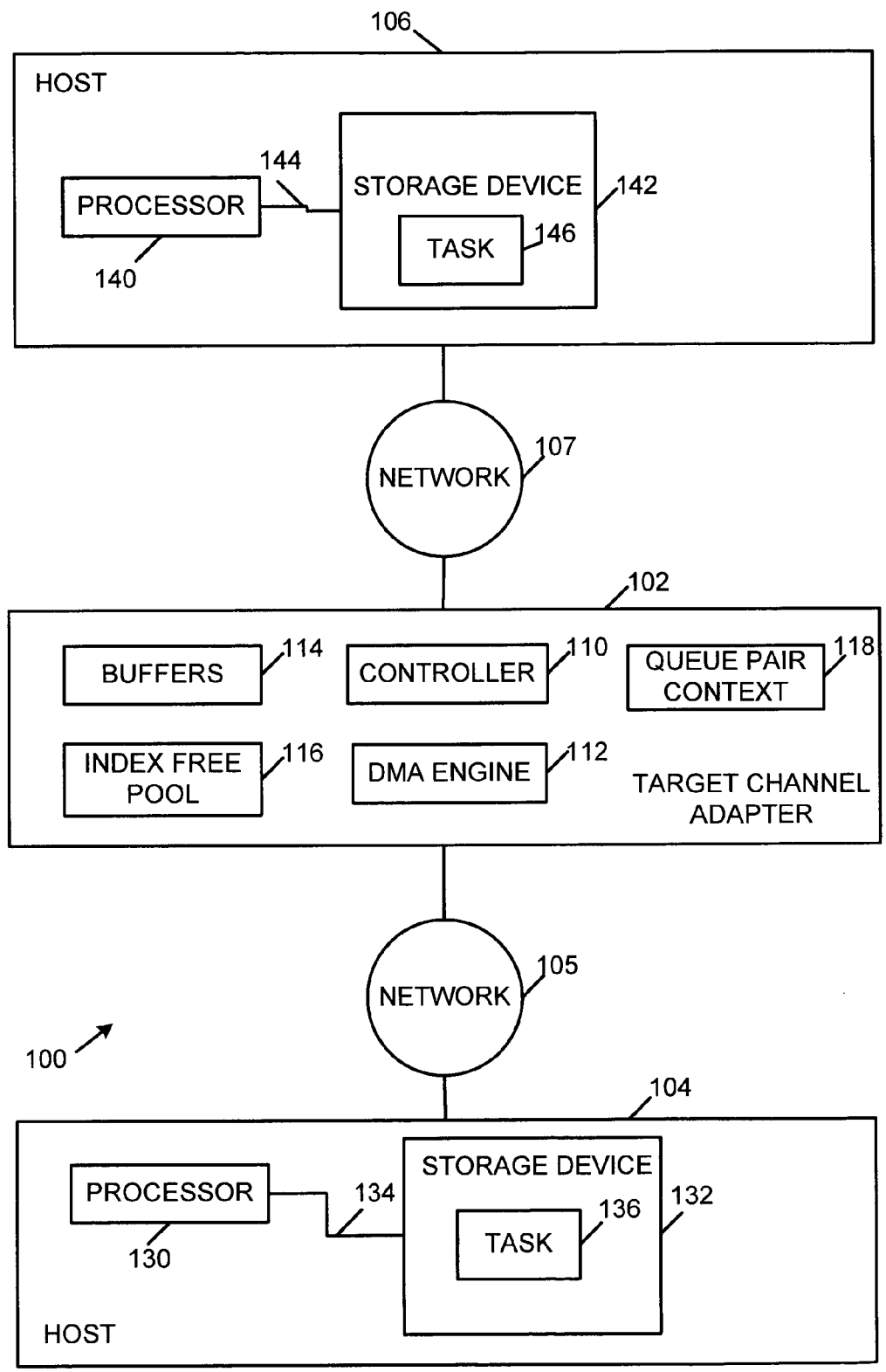
FIG. 1 depicts a block diagram of an example system for implementing an embodiment of the invention.

FIG. 1 depicts a block diagram of an example system 100 for implementing an embodiment of the invention. The system 100 includes a target channel adapter 102 connected to a host 104 via a network 105 and a host 106 via a network 107. Although only one target channel adapter 102, one host 104, one network 105, one host 106, and one network 107 are shown, in other embodiments any number or combination of them may be present.

The target channel adapter 102 includes a controller 110, a DMA (Direct Memory Access) engine 112, buffers 114, an index free pool 116, and a queue pair context 118. The controller 110 allocates and deallocates the buffers 114 from the index free pool 116 and validates the buffers 114 when used by the DMA engine 112. The controller 110 uses the queue pair context 118 to perform the allocation, deallocation, and validation. In an embodiment, the controller 110 may be implemented either partially or completely in hardware via logic gates and/or other appropriate hardware techniques to carry out the allocate, deallocate, validate, and recovery functions as further described below with reference to FIGS. 4, 5, 6, and 7, respectively.

In another embodiment, the controller 110 includes instructions capable of executing on a processor (unillustrated but analogous to the processors further described below with reference to the host 104 and the host 106) or statements capable of being interpreted by instructions executing on a processor.

The DMA engine 112 transfers data between the buffers 114 and the host 104 via the network 105. The DMA engine 112 further transfers data between the buffers 114 and the host 106 via the network 107.

The target channel adapter 102 may be implemented using any suitable hardware and/or software, such as an adapter card. Personal computers, portable computers, laptop or notebook computers, PDAs (Personal Digital Assistants), pocket computers, telephones, pagers, automobiles, teleconferencing systems, appliances, client computers, server computers, and mainframe computers are examples of other possible configurations of the target channel adapter 102.

The host 104 includes a processor 130 and a storage device 132, connected directly or indirectly via a bus 134. The processor 130 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 130 executes instructions and includes that portion of the host 104 that controls the operation of the entire host. Although not depicted in FIG. 1, the processor 130 typically includes a control unit that organizes data and program storage in memory and transfers data and other information between the various parts of the host 104. The processor 130 reads and/or writes code and data to/from the storage device 132 and/or the network 105.

Although the host 104 is shown to contain only a single processor 130 and a single bus 134, other embodiments of the present invention apply equally to hosts that may have multiple processors and multiple buses with some or all performing different functions in different ways.

The storage device 132 represents one or more mechanisms for storing data. For example, the storage device 132 may include read only memory (ROM), random access memory (RAM), magnetic disk storage media, hard disk media, floppy disk media, tape media, CD (compact disk) media, DVD (digital video disk or digital versatile disk) media, optical storage media, flash memory devices, and/or other machine-readable media. In other embodiments, any appropriate type of storage device may be used. Although only one storage device 132 is shown, multiple storage devices and multiple types of storage devices may be present. Further, although the host 104 is drawn to contain the storage device 132, the storage device 132 may be external to the host 104 and/or may be distributed across other electronic devices, such as devices connected to the network 105.

The storage device 132 includes a task 136. The task 136 sends work requests to the target channel adapter 102, which cause the controller 110 to allocate and deallocate the buffers 114 and cause the DMA engine 112 to transfer data, as previously described above. In an embodiment, the task 136 includes instructions capable of executing on the processor 130 or statements capable of being interpreted by instructions executing on a processor 130. In an embodiment, the task 136 may be implemented either partially or completely in hardware via logic gates and/or other appropriate hardware techniques.

The bus 134 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The host 104 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, client computers, server computers, and mainframe computers are examples of other possible configurations of the host 104.

The network 105 may be any suitable network or combination of networks and may support any appropriate protocol suitable for communication of data and/or code between the target channel adapter 102 and the host 104. In an embodiment, the network 105 may support Infiniband. In another embodiment, the network 105 may support wireless communications. In another embodiment, the network 105 may support hard-wired communications, such as a telephone line or cable. In another embodiment, the network 105 may support the Ethernet IEEE (Institute of Electrical and Electronics Engineers) 802.3x specification. In another embodiment, the network 105 may be the Internet and may support IP (Internet Protocol). In another embodiment, the network 105 may be a local area network (LAN) or a wide area network (WAN). In another embodiment, the network 105 may be a hotspot service provider network. In another embodiment, the network 105 may be an intranet. In another embodiment, the network 105 may be a GPRS (General Packet Radio Service) network. In another embodiment, the network 105 may be a FRS (Family Radio Service) network. In another embodiment, the network 105 may be any appropriate cellular data network or cell-based radio network technology. In another embodiment, the network 105 may be an IEEE 802.11B wireless network. In still another embodiment, the network 105 may be any suitable network or combination of networks. Although one network 105 is shown, in other embodiments any number of networks (of the same or different types) may be present.

The host 106 includes a processor 140 and a storage device 142, connected directly or indirectly via a bus 144. The storage device 144 includes a task 146. The processor 140, the storage device 142, the bus 144, and the task 146 are analogous to the processor 130, the storage device 132, the bus 134, and the task 136 previously described above. The network 107 is analogous to the network 105 previously described above.

The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the target channel adapter 102 and that, when read and executed by one or more processors (unillustrated) in the target channel adapter 102, cause the target channel adapter 102 to perform the steps necessary to execute steps or elements embodying the various aspects of an embodiment of the invention.

Moreover, while embodiments of the invention have and hereinafter will be described in the context of fully functioning electronic devices, the various embodiments of the invention are capable of being distributed as a program product in a variety of forms, and the invention applies equally regardless of the particular type of signal-bearing medium used to actually carry out the distribution. The programs defining the functions of this embodiment may be delivered to the target channel adapter 102 via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, e.g., the network 105 or the network 107, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2A:
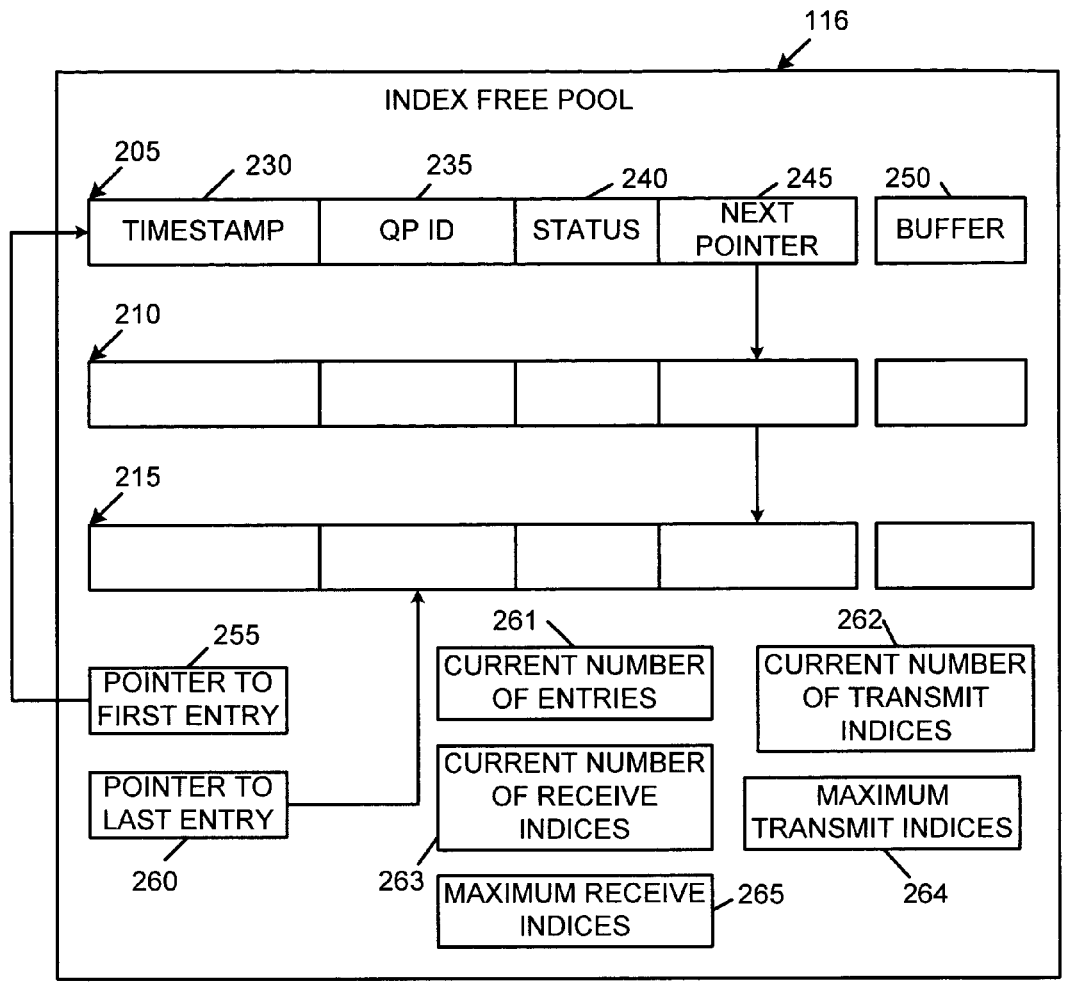
FIG. 2A depicts a block diagram of an example index free pool, according to an embodiment of the invention.

FIG. 2A depicts a block diagram of an example index free pool 116, according to an embodiment of the invention. The index free pool 116 includes one or more entries, such as entries 205, 210, and 215. Each entry includes a timestamp field 230, a queue pair identifier field 235, a status field 240, and a pointer to the next free record 245. Each entry has an associated buffer, such as the buffer 250, which when allocated is part of the buffers 114. An index is a pointer to the associated buffer. The index free pool 116 also includes a pointer to the first entry 255, a pointer to the last entry 260, and a current number of entries in the index free pool 261, a current number of number of transmit operation indices 262, a current number of receive indices 263, a maximum number of transmit indices 264, and a maximum number of receive indices 265.

In an embodiment, the timestamp field 230, the queue pair identifier field 235, and the status field 240 are not used when the entry is part of the index free pool 116, i.e., when the buffer 250 is deallocated, but are used when the entry is not part of the index free pool 116, i.e., after the buffer 250 is allocated. The timestamp field 230 indicates the date and/or time that this entry was last allocated. The queue pair identifier field 235 indicates the queue pair associated with the index. The status field 240 indicates status for the entry, as further described below with reference to FIG. 2B. The pointer to the next entry record 245 points to the next free entry in the index free pool 116. The associated buffer field 250 contains the data associated with the entry.

The pointer to the first entry 255 contains the address of the first entry in the index free pool 116. The pointer to the last entry 260 contains the address of the last entry in the index free pool 116. The current number of entries 261 indicates the current number of entries in the index free pool 116. The current number of transmit operation indices 262 indicates the current number of indices that are being used for a transmit operation. The current number of receive indices 263 indicates the current number of indices that are being used for a receive operation. The maximum number of transmit indices 264 indicates the maximum number of indices that can be used for a transmit operation. The maximum number of transmit indices 264 is used to keep transmit operations from using all of the entries in the index free pool 116, as further described below with reference to FIG. 4. The maximum number of receive indices 265 indicates the maximum number of indices that can be used for a receive operation. The maximum number of receive indices 265 is used to keep receive operations from using all of the entries in the index free pool 116, as further described below with reference to FIG. 4.

Figure 2B:
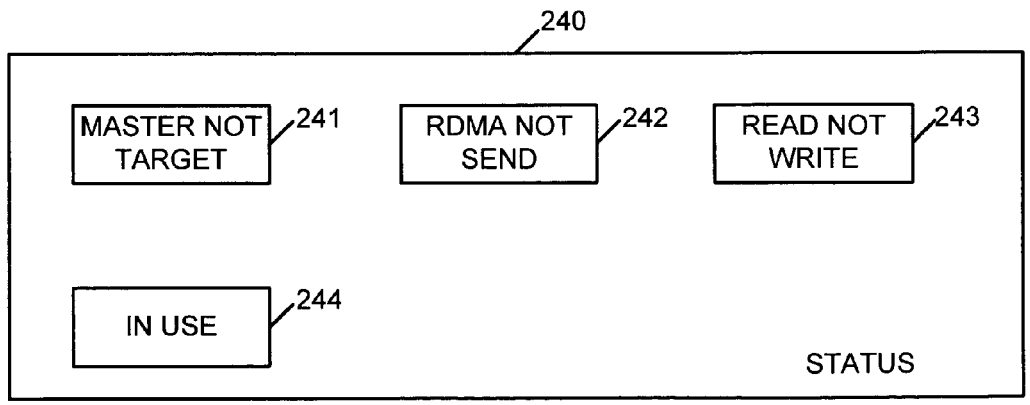
FIG. 2B depicts a block diagram of example status for an index entry, according to an embodiment of the invention.

FIG. 2B depicts a block diagram of example status 240 for an index entry, according to an embodiment of the invention. The master not target field 241 indicates whether the index will be used for a master operation or a target operation. The RDMA (Remote DMA) not send field 242 indicates whether the index will be used for a RDMA or a send-receive data transfer. In a send-receive data transfer, the target pre-posts receive work requests that identify memory regions where incoming data will be placed. The source posts a send work request that identifies the data to send. Each send operation on the source consumes a receive work request on the target. In contrast, RDMA messages identify both the source and destination buffers, and data can be directly written to or read from a remote address space without involving the target process. But, both processes must exchange information regarding their registered buffers.

The read not write field 243 indicates whether the index will be used for a read operation or a write operation. The read not write field 243 is only used during a RDMA. The in use field 244 indicates whether the entry is allocated or free.

Figure 3:
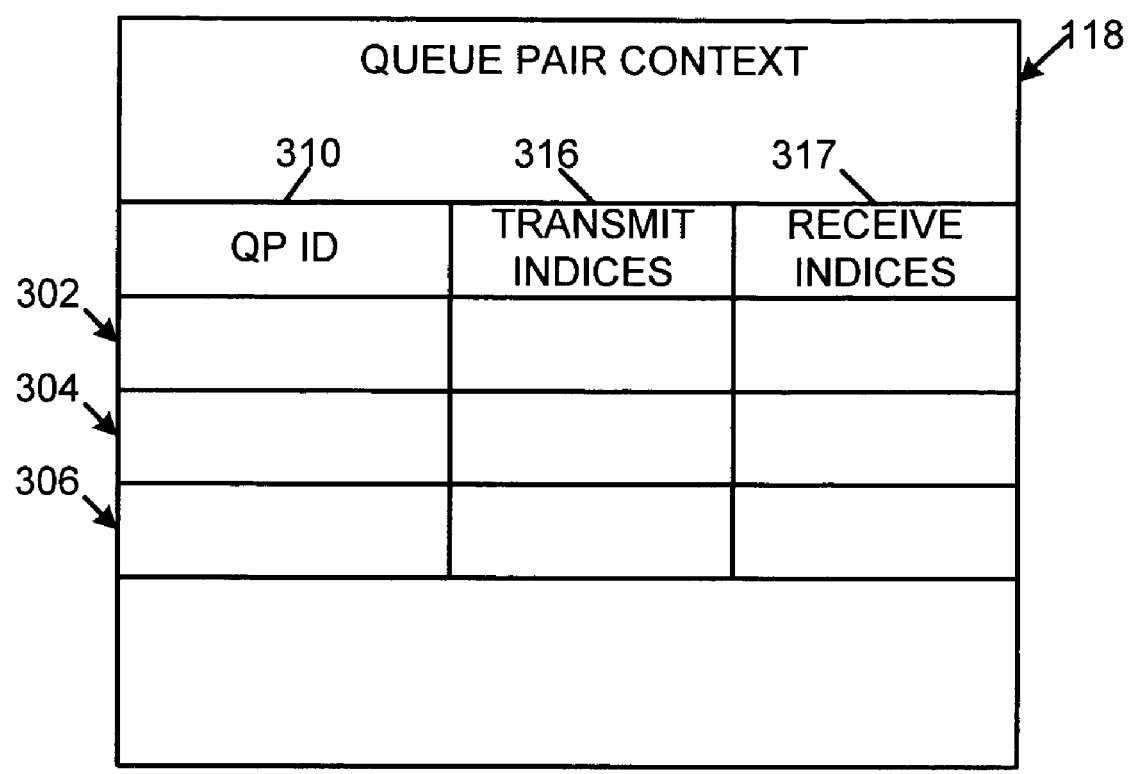
FIG. 3 depicts a block diagram of an example queue pair context, according to an embodiment of the invention.

FIG. 3 depicts a block diagram of an example queue pair context 118, according to an embodiment of the invention. The queue pair context 118 includes entries 302, 304, and 306, but in other embodiment any number of entries may be present. Each entry includes a queue pair identifier field 310, a transmit indices field 316, and a receive indices field 317. The queue pair identifier field 310 identifies the queue pair associated with this entry. The transmit indices field 316 indicates the current number of indices in the index free pool 116 that can be used for this queue pair transmit operation. The receive indices field 317 indicates the current number of indices in the index free pool 116 that can be used for this queue pair receive operation. The transmit indices 316 and the receive indices 317 are used to prevent one queue pair from using an excessive number of entries from the index free pool 116 to the exclusion of other queue pairs, as further described below with reference to FIG. 4.

Figure 4:
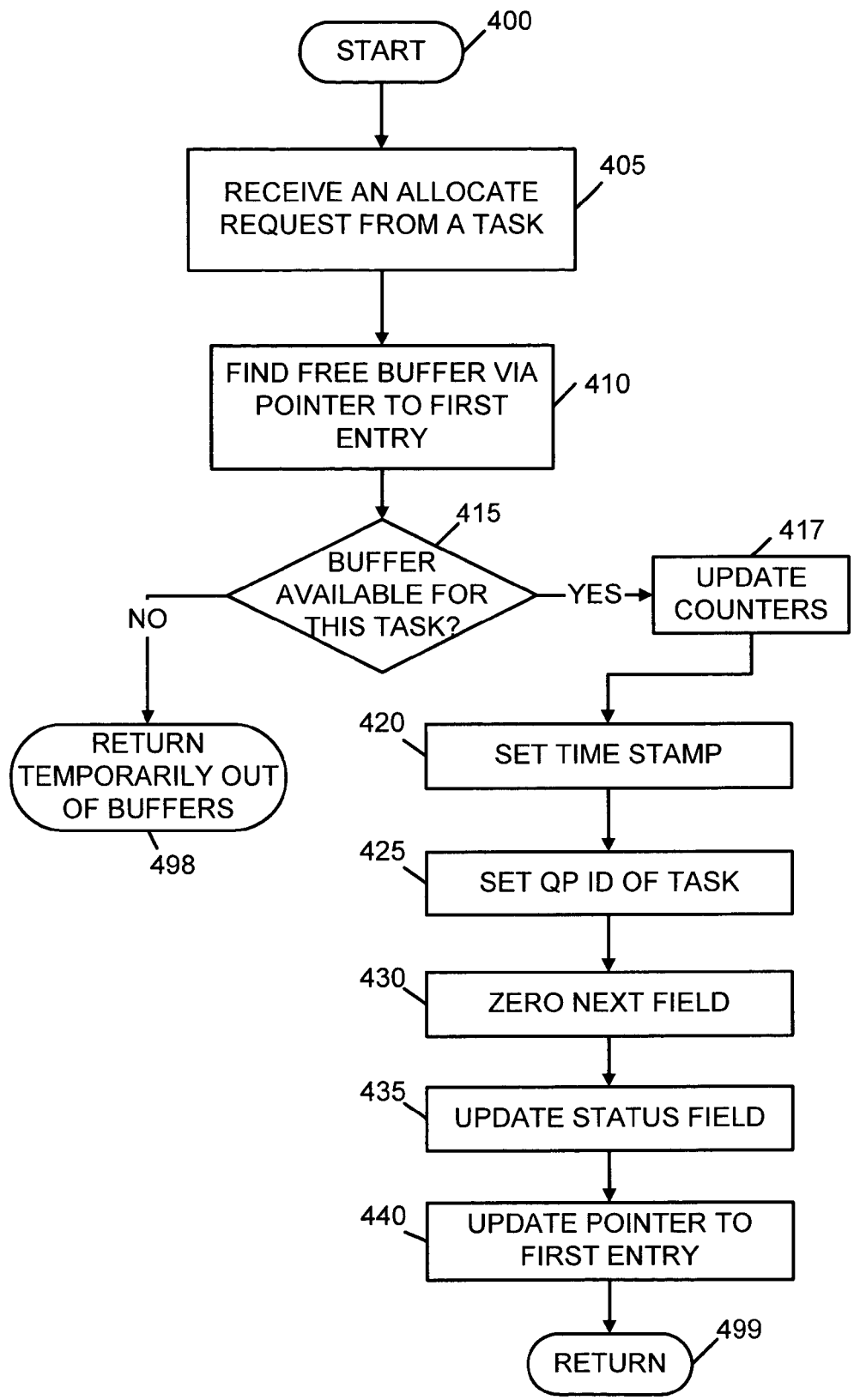
FIG. 4 depicts a flowchart of example processing for an allocate function in a controller, according to an embodiment of the invention.

FIG. 4 depicts a flowchart of example processing for an allocate function in the controller 110, according to an embodiment of the invention. Control begins at block 400. Control then continues to block 405 where the controller 110 receives an allocate request from the task 136 or the task 146. Control then continues to block 410 where the controller 110 finds a free buffer 250 in the index free pool 116 via the pointer to the first entry 255.

Control then continues to block 415 where the controller 110 determines whether the free buffer 250 is available for the requesting task 136 or 146. In an embodiment, the controller 110 makes the determination at block 415 by determining whether the current number of entries 261 is greater than zero, whether the current number of receive indices 263 is less than the maximum number of receive indices 265 for a receive operation, whether the current number of transmit indices 262 is less than the maximum number of transmit indices 264 for a transmit operation, whether the transmit indices 316 for the current queue pair is greater than zero and greater than or equal to the remaining operation size for a transmit operation, and whether the receive indices 317 for the current queue pair is greater than zero and greater than or equal to the remaining operation size for a receive operation.

If the determination at block 415 is true, then control continues to block 417 where the controller 110 updates counters. In an embodiment, the controller 110 decrements the current number of entries in the index free pool 261, increments the current number of transmit indices 262 for a transmit operation, increments the current number of receive indices 263 for a receive operation, decrements the transmit indices 316 associated with the current queue pair for a transmit operation, and decrements the receive indices 317 associated with the current queue pair for a receive operation.

Control then continues to block 420 where the controller 110 sets the current date and/or time in the timestamp field 230 of the entry that was previously found at block 410. Control then continues to block 425 where the controller 110 sets an identifier of the queue pair in the task that initiated the allocate request in the queue identifier field 235 of the entry. Control then continues to block 430 where the controller 110 zeros the next pointer field 245 in the entry. In another embodiment, the controller 110 may set any value in the next pointer field 245 to indicate that it no longer points at an entry in the index free pool 116.

Control then continues to block 435 where the controller 110 updates the status field 240. In an embodiment, the controller 110 sets the master not target field 241 to indicate whether the queue pair will use the allocated index for a master operation or a target operation, sets the RDMA not send field 242 to indicate whether the queue pair will use the allocated index for a RDMA or a send operation, sets the read not write field 243 to indicate whether the queue pair will use the allocated index for a read or a write operation, and sets the in use field 244 to indicate that the entry is allocated.

Control then continues to block 440 where the controller 110 updates the pointer to the first entry 255 to point to the entry in the index free pool 116 that follows the allocated entry (where the next pointer 245 of the allocated entry previously pointed). Control then continues to block 499 where the function returns an index to the allocated buffer to the invoker.

If the determination at block 415 is false, then control continues to block 498 where the allocate function in the controller 110 returns a temporarily out of buffers error condition to the invoker.

Figure 5:
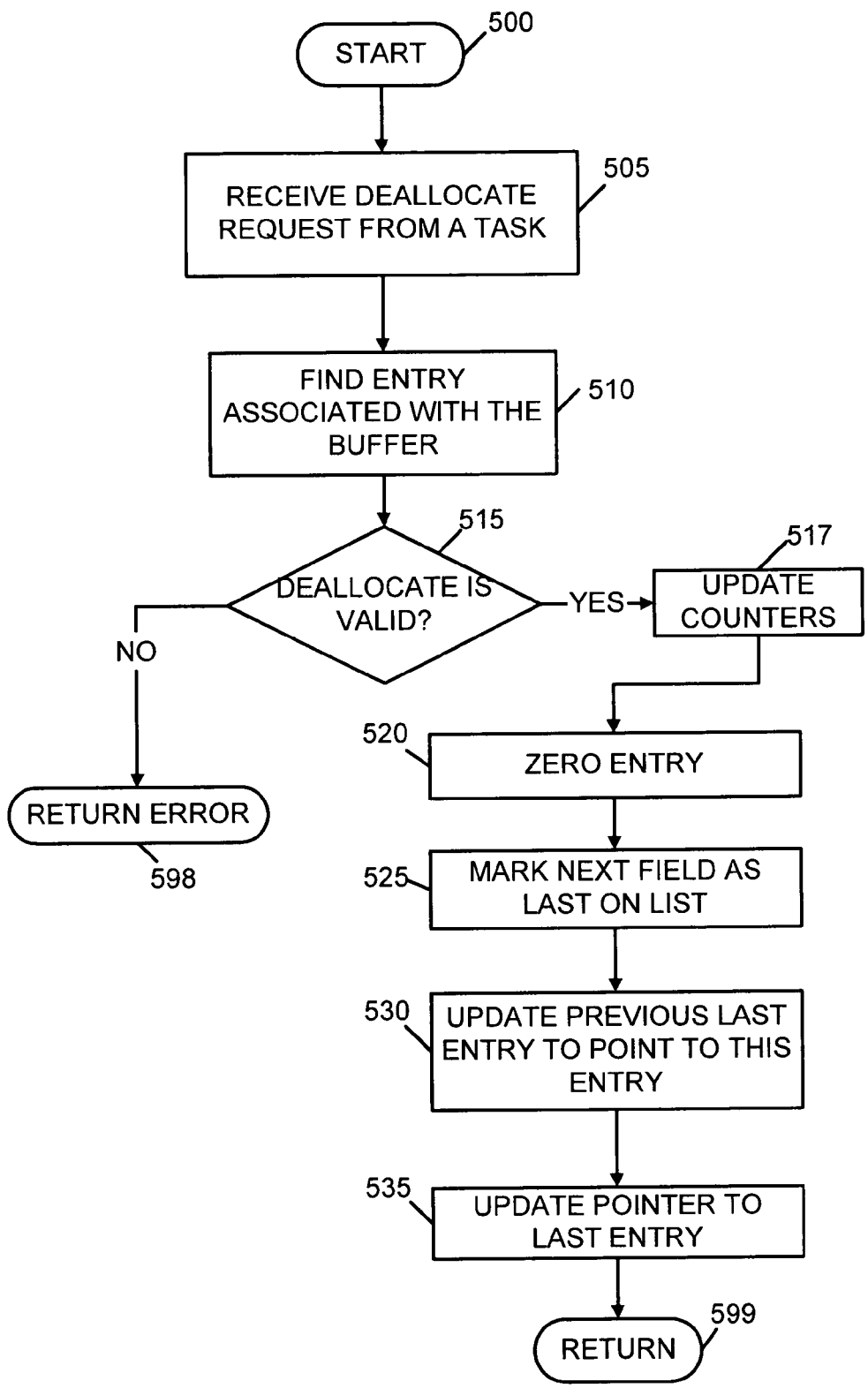
FIG. 5 depicts a flowchart of example processing for a deallocate function in a controller, according to an embodiment of the invention.

FIG. 5 depicts a flowchart of example processing for a deallocate function in the controller 110, according to an embodiment of the invention. Control begins at block 500. Control then continues to block 505 where the controller 110 receives an deallocate request from the task 136 or the task 146 that requests that a buffer be deallocated and its associated entry be returned to the index free pool 116. Control then continues to block 510 where the controller 110 finds the associated entry.

Control then continues to block 515 where the controller 110 determines whether the deallocate request is valid. In an embodiment, the controller 110 determines whether the entry is allocated to the requesting task (whether the queue pair identifier 235 matches the queue pair identifier passed by the task), whether the in use flag 244 is set, and whether the master not target 241, RDMA not send 242, and read not write 243 match the values provided by the requesting task.

If the determination at block 515 is true, then control continues to block 517 where the controller updates counters. In an embodiment, at block 517 the controller 110 increments the current number of entries in the index free pool 261, decrements the current number of transmit indices 262 for a transmit operation, decrements the current number of receive indices 263 for a receive operation, increments the transmit indices 316 associated with the current queue pair for a transmit operation, and increments the receive indices 317 associated with the current queue pair for a receive operation.

Control then continues to block 520 where the controller 110 zeros the newly deallocated entry. Control then continues to block 525 where the controller 110 sets the next pointer 245 in the newly deallocated entry to indicate that no entries follow, i.e., the newly deallocated entry will be the last entry in the index free pool 116. Control then continues to block 530 where the controller 110 updates the previous last entry to point to the newly deallocated entry in the index free pool 116. Control then continues to block 535 where the controller 110 updates the pointer to the last entry 260 to point to the newly deallocated entry. Control then continues to block 599 where the deallocate function in the controller 110 returns.

If the determination at block 515 is false, then control continues to block 598 where the deallocate function in the controller 110 returns an error condition to the invoker.

Figure 6:
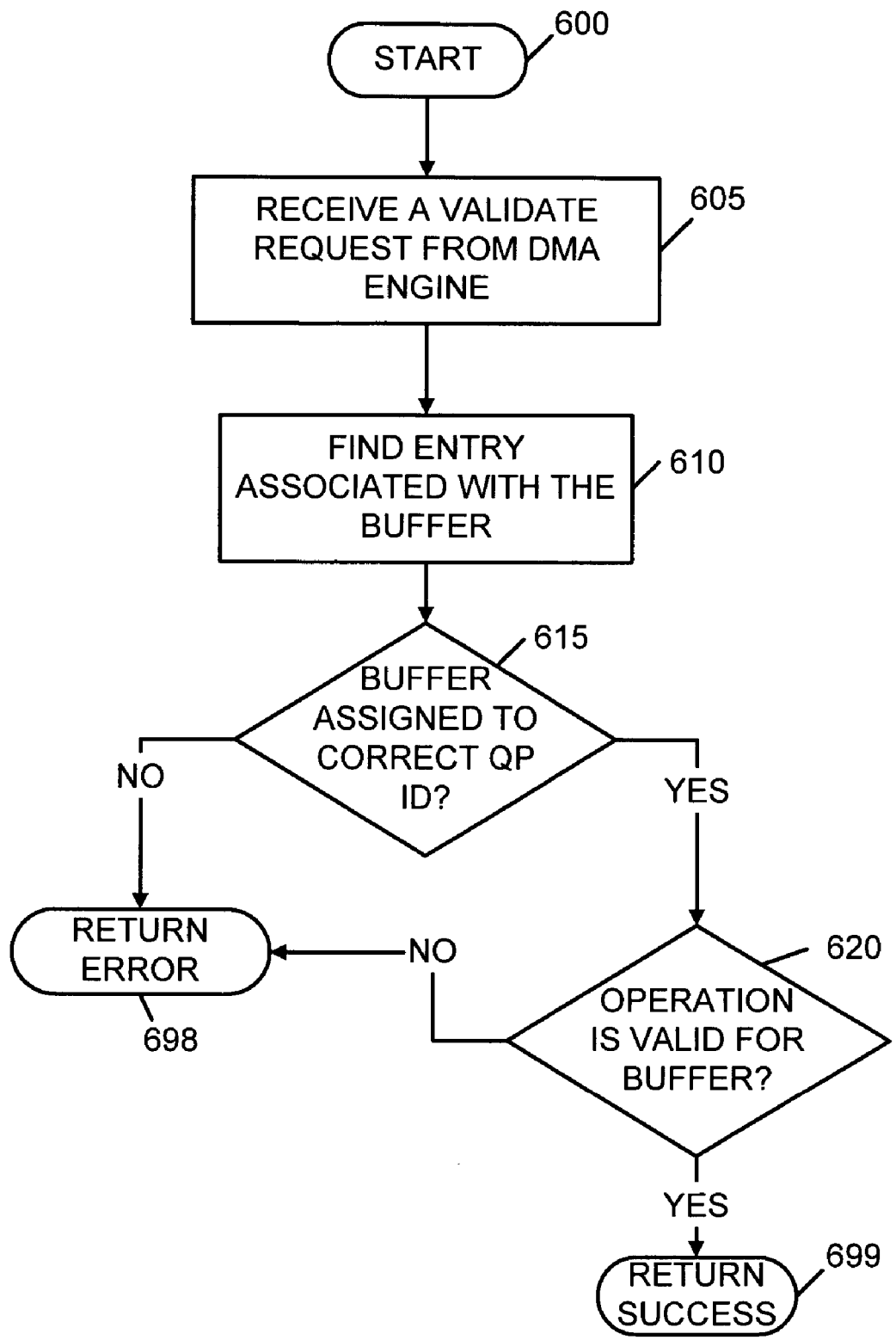
FIG. 6 depicts a flowchart of example processing for a validate function in a controller, according to an embodiment of the invention.

FIG. 6 depicts a flowchart of a validate function in the controller 110, according to an embodiment of the invention. Control begins at block 600. Control then continues to block 605 where the controller 110 receives a validate buffer request from the DMA engine 112. Control then continues to block 610 where the controller 110 finds the entry associated with the buffer provided by the DMA engine 112. Control then continues to block 615 where the controller 110 determines whether the buffer is assigned to the correct queue pair by determining whether the queue pair identifier 235 in the entry associated with the buffer matches the queue pair identifier provided by the DMA engine 112.

If the determination at block 615 is true, then control then continues to block 620 where the controller 110 determines whether the operation being performed by the DMA engine 112 is valid for the buffer based on the entry associated with the buffer. In an embodiment, at block 620 the controller 110 determines whether the entry is allocated to the task associated with the operation that the DMA engine 112 is performing (whether the queue pair identifier 235 matches the queue pair identifier passed by the task), whether the in use flag 244 is set, and whether the master not target 241, the RDMA not send 242, and the read not write 243 match the values provided by the requesting task.

If the determination at block 620 is true, then control then continues to block 699 where the function returns indicating a successful validation. If the determination at block 620 is false, then control continues to block 698 where the validate function in the controller 110 returns an error to the DMA engine 112.

If the determination at block 615 is false, then control continues to block 698 where the validate function in the controller 110 returns an error to the DMA engine 112.

Figure 7:
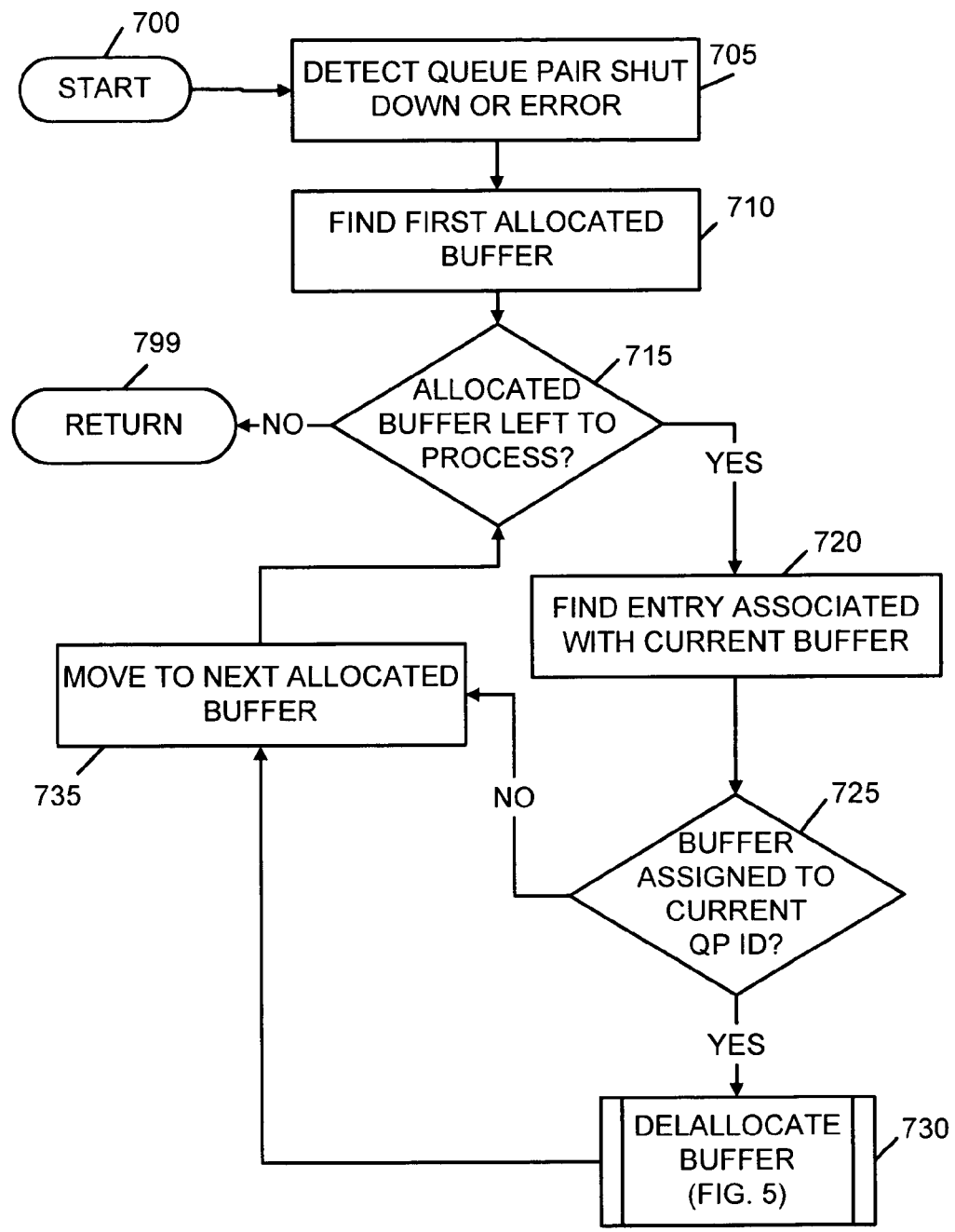
FIG. 7 depicts a flowchart of example processing for a recovery function in a controller, according to an embodiment of the invention.

FIG. 7 depicts a flowchart of a recovery function in the controller 110, according to an embodiment of the invention. Control begins at block 700. Control then continues to block 705 where the controller 110 detects a queue pair shutdown or error. Control then continues to block 710 where the controller 110 finds the first allocated buffer in the buffers 114 and makes it the current allocated buffer. In an embodiment, the controller 110 finds the first allocated buffer in the buffers 114 by starting at the beginning of the index free pool 116 and reading each entry until an entry is found with the in use flag 244 set. Control then continues to block 715 where the controller 110 determines whether there is a current allocated buffer left to process.

If the determination at block 715 is true, then control continues to block 720 where the controller 110 finds the entry associated with the current allocated buffer. Control then continues to block 725 where the controller 110 determines whether the current allocated buffer is assigned to the queue pair for which the shutdown or error was previously detected at block 705. The controller 110 performs the determination at block 110 by determining whether the queue pair identifier field 235 in the entry associated with the current allocated buffer matches the queue pair that was previously detected at block 705.

If the determination at block 725 is true, then control continues to block 730 where the controller 110 deallocates the current allocated buffer as previously described above with reference to FIG. 5. Control then continues to block 735 where the controller 110 moves the current allocated buffer to the next allocated buffer in the buffers 114. In an embodiment, the controller 110 finds the next allocated buffer in the buffers 114 by continuing to read each entry in the index free pool 116 until the next entry is found with the in use flag 244 set. Control then returns to block 715, as previously described above.

If the determination at block 725 is false, then the current allocated buffer is not assigned to the current queue pair identifier, so control continues to block 735, as previously described above.

If the determination at block 715 is false, then all of the allocated buffers in the buffers 114 have been processed by the logic of FIG. 7, so control continues to block 799 where the recovery function in the controller 110 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   receiving an allocate request from a queue pair;
   finding a free buffer associated with an entry in a free pool;
   determining whether a number of buffers allocatable to the queue pair is greater than zero;
   deciding whether a number of buffers allocated to an operation type is less than a maximum;
   allocating the free buffer to the queue pair if the queue pair requests the free buffer for an operation having the operation type, the number of buffers allocatable to the queue pair is greater than zero, and the number of buffers allocated to the operation type is less than a maximum, wherein the allocating further comprises setting an identifier of the queue pair into the entry in the free pool and setting status in the entry in the free pool, wherein the setting the status in the entry in the free pool further comprises setting a use of the free buffer in the entry;
   receiving a validate request and a provided queue pair identifier from a direct memory access engine, wherein the validate request is associated with a data transfer that uses the free buffer;
   in response to the receiving the validate request from the direct memory access engine, determining whether the provided queue pair identifier matches the queue pair identifier in the entry in the free pool, determining whether a requester of the data transfer matches the identifier of the queue pair in the entry in the free pool, and determining whether provided status provided by the requestor matches the status in the entry in the free pool;
   if the provided queue pair identifier matches the queue pair identifier in the entry in the free pool, the requester of the data transfer matches the identifier of the queue pair in the entry in the free pool, and the provided status provided by the requestor matches the status in the entry in the free pool, returning an indication of a successful validation;
   if the provided queue pair identifier does not match the queue pair identifier in the entry in the free pool, returning an error to the direct memory access engine;
   if the requester of the data transfer does not match the identifier of the queue pair in the entry in the free pool, returning the error to the direct memory access engine; and
   if the provided status provided by the requestor does not match the status in the entry in the free pool, returning the error to the direct memory access engine.

2. The method of claim 1, wherein the use comprises an indication of whether the free buffer is to be used for a master operation and an indication of whether the free buffer is to be used for a target operation.

3. The method of claim 1, wherein the use comprises an indication of whether the free buffer is to be used for a read operation and an indication of whether the free buffer is to be used for a write operation.

4. The method of claim 1, wherein the use comprises an indication of whether the free buffer is to be used for an RDMA operation and an indication of whether the free buffer is to be used for a send operation.

5. The method of claim 1, wherein the determining whether the number of buffers allocatable to the queue pair is greater than zero further comprises:
   determining whether the number of buffers allocatable to the queue pair is greater than a remaining size of the operation.

6. The method of claim 1, wherein the operation type is a transmit.

7. The method of claim 1, wherein the operation type is a receive.

8. An apparatus comprising:
   means for receiving an allocate request from a queue pair;
   means for finding a free buffer associated with an entry in a free pool;
   means for determining whether a number of buffers allocatable to the queue pair is greater than zero;
   means for deciding whether a number of buffers allocated to an operation type is less than a maximum;
   means for allocating the free buffer to the queue pair if the queue pair requests the free buffer for an operation having the operation type, the number of buffers allocatable to the queue pair is greater than zero, and the number of buffers allocated to the operation type is less than a maximum, wherein the means for allocating further comprises setting an identifier of the queue pair into the entry in the free pool and setting status in the entry in the free pool, wherein the setting the status in the entry in the free pool further comprises setting a use of the free buffer in the entry;
   means for receiving a validate request and a provided queue pair identifier from a direct memory access engine, wherein the validate request is associated with a data transfer that uses the free buffer;
   means for determining whether the provided queue pair identifier matches the queue pair identifier in the entry in the free pool, determining whether a requester of the data transfer matches the identifier of the queue pair in the entry in the free pool, and determining whether provided status provided by the requestor matches the status in the entry in the free pool, in response to the means for receiving the validate request from the direct memory access engine;

means for returning an indication of a successful validation if the provided queue pair identifier matches the queue pair identifier in the entry in the free pool, the requester of the data transfer matches the identifier of the queue pair in the entry in the free pool, and the provided status provided by the requester matches the status in the entry in the free pool;

means for returning an error to the direct memory access engine if the provided queue pair identifier does not match the queue pair identifier in the entry in the free pool;

means for returning the error to the direct memory access engine if the requester of the data transfer does not match the identifier of the queue pair in the entry in the free pool; and means for returning the error to the direct memory access engine if the provided status provided by the requestor does not match the status in the entry in the free pool.

9. The apparatus of claim 8, wherein the use comprises an indication of whether the free buffer is to be used for a master operation and an indication of whether the free buffer is to be used for a target operation.

10. The apparatus of claim 8, wherein the use comprises an indication of whether the free buffer is to be used for a read operation and an indication of whether the free buffer is to be used for a write operation.

11. The apparatus of claim 8, wherein the means for determining whether the number of buffers allocatable to the queue pair is greater than zero further comprises:

means for determining whether the number of buffers allocatable to the queue pair is greater than a remaining size of the operation.

12. The apparatus of claim 8, wherein the operation type is a transmit.

13. The apparatus of claim 8, wherein the operation type is a receive.

14. The apparatus of claim 8, further comprising:

means for deallocating the free buffer if the requestor matches the queue pair.

15. An adapter comprising:

a free pool of a plurality of entries; and a controller that receives a plurality of allocate requests from a plurality of queue pairs, finds a plurality of free buffers in the free pool, determines whether a number of buffers allocatable to the plurality of queue pairs is greater than zero, decides whether a number of buffers allocated to an operation type is less than a maximum, allocates the plurality of free buffers to the plurality of queue pairs if the plurality of queue pairs request the plurality of free buffers for an operation having the operation type, the number of buffers allocatable to the plurality of queue pairs is greater than zero, and the number of buffers allocated to the operation type is less than a maximum, sets an identifier of the plurality of queue pairs into the plurality of entries in the free pool, and sets status in the plurality of entries in the free pool, wherein the set of the status in the plurality of entries in the free pool further sets a use of the plurality of free buffers in the plurality of entries, receives a validate request and a provided queue pair identifier from a direct memory access engine, wherein the validate request is associated with a data transfer that uses one of the plurality of free buffers, determines whether the provided queue pair identifier matches the queue pair identifier in one of the plurality of entries in the free pool, determines whether a requester of the data transfer matches the identifier of one of the plurality of queue pairs in the one of the plurality of entries in the free pool, and determines whether provided status provided by the requestor matches the status in the one of the plurality of entries in the free pool, in response to the receive of the validate request from the direct memory access engine, returns an indication of a successful validation if the provided queue pair identifier matches the queue pair identifier in the one of the plurality of entries in the free pool, the requester of the data transfer matches the identifier of the one of the plurality of queue pairs in the one of the plurality of entries in the free pool, and the provided status provided by the requester matches the status in the one of the plurality of entries in the free pool, returns an error to the direct memory access engine if the provided queue pair identifier does not match the queue pair identifier in the one of the plurality of entries in the free pool, returns the error to the direct memory access engine if the requester of the data transfer does not match the identifier of the one of the plurality of queue pairs in the one of the plurality of entries in the free pool, and returns the error to the direct memory access engine if the provided status provided by the requestor does not match the status in the one of the plurality of entries in the free pool.

16. The adapter of claim 15, wherein the use comprises an indication of whether each of the respective plurality of free buffers is to be used for a master or a target operation.

17. The adapter of claim 15, wherein the use comprises an indication of whether each of the respective plurality of free buffers is to be used for a RDMA or a send operation.

18. The adapter of claim 15, wherein the use comprises an indication of whether each of the respective plurality of free buffers is to be used for a read or a write operation.

* * * * *